(12) United States Patent
Gagnier et al.

(10) Patent No.: US 9,311,334 B2
(45) Date of Patent: Apr. 12, 2016

(54) GEOSPATIAL DATABASE INTEGRATION USING BUSINESS MODELS

(75) Inventors: Ronald L. Gagnier, Ottawa (CA); Michael A. Iles, Ottawa (CA); Steven R. McDougall, Kanata (CA); David J. Ridgeway, Gloucester (CA); Craig A. Statchuk, North Gower (CA)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 13/185,240

(22) Filed: Jul. 18, 2011

(65) Prior Publication Data

US 2012/0054174 A1 Mar. 1, 2012

(30) Foreign Application Priority Data

Aug. 25, 2010 (CA) .................................... 2712028

(51) Int. Cl.
*G06F 7/00* (2006.01)
*G06F 17/30* (2006.01)

(52) U.S. Cl.
CPC .... *G06F 17/30241* (2013.01); *G06F 17/30522* (2013.01)

(58) Field of Classification Search
None
See application file for complete search history.

(56) References Cited

U.S. PATENT DOCUMENTS

| | | |
|---|---|---|
| 6,684,219 B1 | 1/2004 | Shaw et al. |
| 6,999,958 B2 * | 2/2006 | Carlson et al. ......... 707/999.001 |
| 7,376,636 B1 | 5/2008 | Wang et al. |
| 7,533,112 B2 * | 5/2009 | Beatty et al. ......................... 1/1 |
| 7,743,048 B2 | 6/2010 | Baldwin |
| 2003/0225725 A1 | 12/2003 | Miller et al. |
| 2004/0030490 A1 | 2/2004 | Hegedus et al. |
| 2004/0215626 A1 * | 10/2004 | Colossi et al. ................ 707/100 |
| 2005/0022115 A1 * | 1/2005 | Baumgartner et al. ....... 715/513 |
| 2005/0091223 A1 | 4/2005 | Shaw et al. |
| 2007/0260628 A1 | 11/2007 | Fuchs et al. |
| 2009/0007062 A1 | 1/2009 | Gilboa |
| 2009/0177643 A1 * | 7/2009 | Gupta et al. ...................... 707/5 |
| 2009/0204783 A1 * | 8/2009 | Lyle et al. .................... 711/202 |
| 2009/0319556 A1 * | 12/2009 | Stolte et al. .................. 707/102 |
| 2010/0106407 A1 * | 4/2010 | Yamazaki et al. ............ 701/207 |
| 2010/0131196 A1 | 5/2010 | Searight et al. |
| 2010/0131501 A1 * | 5/2010 | Deeming et al. .............. 707/724 |

(Continued)

FOREIGN PATENT DOCUMENTS

EP 1 139 066 A2 10/2001
JP 2001229186 A 8/2001

(Continued)

OTHER PUBLICATIONS

Teradata Magazine Online, "Automatic Features Change Latitude Into Actionable Data," www.teradatamagazine.com, 3 pages (May 24, 2011).

(Continued)

*Primary Examiner* — Jau-Shya Meng
(74) *Attorney, Agent, or Firm* — Shumaker & Sieffert, P.A.

(57) ABSTRACT

A mechanism is provided for automatically performing join operations. Source data is received and a metadata model is received. The metadata model includes a hierarchical structure. The source data is aligned to the hierarchical structure in the metadata model to form a source data hierarchy. Based on the source data hierarchy, the source data is joined to geocoded information.

24 Claims, 7 Drawing Sheets

(56) References Cited

U.S. PATENT DOCUMENTS

2010/0145979 A1 6/2010 Barnett
2012/0278339 A1* 11/2012 Wang .......................... 707/748

FOREIGN PATENT DOCUMENTS

JP          2004094740 A    3/2004
WO          2008154571 A1   12/2008

OTHER PUBLICATIONS

Forefront Design Specialist, "Route Mapper Enterprise," www.forefrontdesignspecialist.com, 3 pages (2007).

Vijay Kumar, "Geo-Spatial Business Intelligence Solution: For Sales and Marketing division, Rogers Communications: A Geo-Spatial Technology Practice," http://www.gisdevelopment.net/application/business/mwf09_rogersnew.htm (11 pages) dated Aug. 7, 2010.

Jun-san Zhao et al., "Methods and Implementation of the Geospatial Databases Integration and Update Towards E-Government," ISPRS Workshop on Service and Application of Spatial Data Infrastructure, XXXVI(4/W6), Oct. 14-16, 2005, Hangzhou, China (pp. 203-208).

"ARC/Info: An example of a Contemporary Geographic Information System," Introductory Readings in Geographic Information System, Jan. 1, 1995, pp. 90-99.

Ooi et al., "Extending a DBMS for Geographic Appliatons" Fifth International Conference in Data Engineering, Feb. 6-10, 1989, pp. 590-597.

International Search Report and Written Opinion of international application No. PCT/EP2011/064391, dated Nov. 7, 2011, 12 pp.

* cited by examiner

FIG. 2

| Hierarchy | Level | Source table.column |
|---|---|---|
| Country | 0 | sales.country |
| [contains] State/Province | 1 | sales.state |
| [contains] County | 2 | sales.county |
| [contains] City | 3 | sales.city |
| [contains] Customers | 4 | customers.customer |
| [has] Address | 5 | customers.address |

205 → Hierarchy
210 → Level
215 → Source table.column
200

Source Data 100 (sales.country through customers.address)
Reporting Model 101 (Hierarchy and Level columns)

| Hierarchy | Level | Source table.column |
|---|---|---|
| Country | 0 | sales.country |
| [contains] Region | 1 | eastern sales.region |
| [contains] States | 2 | eastern sales.states |
| [contains] Cities | 3 | eastern sales.city |
| [contains] Customer | 4 | customers.customer |
| [has] Address | 5 | customers.address |

← 405   ← 410   ← 415

Reporting Model 101   Source Data 100

GEOSPATIAL DATABASE INTEGRATION USING BUSINESS MODELS

TECHNICAL FIELD

The present disclosure relates to generating reports using one or more computing devices.

BACKGROUND

A geographic information system (GIS), or geographical information system, is any system that captures, stores, analyzes, manages, and presents data that are linked to location. In the simplest terms, GIS is the merging of cartography, statistical analysis, and database technology. GIS systems are used in cartography, remote sensing, land surveying, utility management, natural resource management, photogrammetry, geography, urban planning, emergency management, navigation, and localized search engines. As GIS is a system, it establishes boundaries that may be jurisdictional, purpose oriented, or application oriented for which a specific GIS is developed. Hence, a GIS developed for an application, jurisdiction, enterprise, or purpose may not be necessarily interoperable or compatible with a GIS that has been developed for some other application, jurisdiction, enterprise, or purpose. Also, GIS includes a spatial (or geospatial) data infrastructure (SDI), which is a concept that has no such restrictive boundaries. Therefore, in a general sense, the term describes any information system that integrates, stores, edits, analyzes, shares, and displays geographic information. In a more generic sense, GIS applications are tools that allow users to create interactive queries (user-created searches), analyze spatial information, edit data, maps, and present the results of all these operations.

Geospatial is a term widely used to describe the combination of spatial software and analytical methods with terrestrial or geographic datasets. The term is often used in conjunction with geographic information systems (GIS) and geomatics. Many geographic information system (GIS) products apply geospatial analysis.

Geographical information systems can be further exploited in non-intuitive ways to assist various enterprises, such as businesses.

BRIEF SUMMARY

According to example embodiments, a method to automatically perform join operations is provided. Source data is received and a model, which may be referred to as a metadata model, is received. The model includes a hierarchical structure. The source data is aligned to the hierarchical structure in the model to form a source data hierarchy. Based on the source data hierarchy, the source data is joined to geocoded information.

According to example embodiments, a device is configured to automatically perform join operations. The device includes a memory to store computer-executable instructions and a processor coupled to the memory. The processor, upon execution of the computer-executable instructions, is configured to: receive source data; receive a metadata model, wherein the metadata model comprises a hierarchical structure; align the source data to the hierarchical structure in the metadata model to form a source data hierarchy; and based on the source data hierarchy, join the source data to geocoded information.

According to example embodiments, a computer program product is provided. The computer program product includes a computer-readable medium containing computer executable program code stored thereon, the computer executable program code including: computer executable program code to receive source data; computer executable program code to receive a metadata model, wherein the metadata model comprises a hierarchical structure describing source data relationships; computer executable program code to align the source data to the hierarchical structure in the metadata model to form a source data hierarchy; and computer executable program code to, based on the source data hierarchy, join the source data to geocoded information.

According to example embodiments, a method to exploit geocoded information for a business report is provided. Keys are automatically generated to be utilized for joining business data to geocoded information. The keys are determined based on a relative position of the keys in a business model hierarchy related to the business data. The business data is joined to the geocoded information based on at least one key of the keys. A geospatial report of the business data is generated, and the geospatial report includes geocoded information based on joining the at least one key.

According to example embodiments, a computer program product is provided. The computer program product includes a computer-readable medium containing computer executable program code stored thereon. The computer executable program code includes: computer executable program code to automatically generate keys to be utilized for joining business data to geocoded information, wherein the keys are determined based on a relative position of the keys in a business metadata model hierarchy related to the business data; computer executable program code to join the business data to the geocoded information based on at least one key of the keys; and computer executable program code to generate a geospatial report of the business data, wherein the geospatial report comprises the geocoded information based on joining the at least one key.

BRIEF DESCRIPTION OF THE SEVERAL VIEWS OF THE DRAWINGS

FIG. 2 illustrates a source data hierarchy according to example embodiments.

FIG. 4 illustrates a source data hierarchy according to example embodiments.

DETAILED DESCRIPTION

Figure 1:
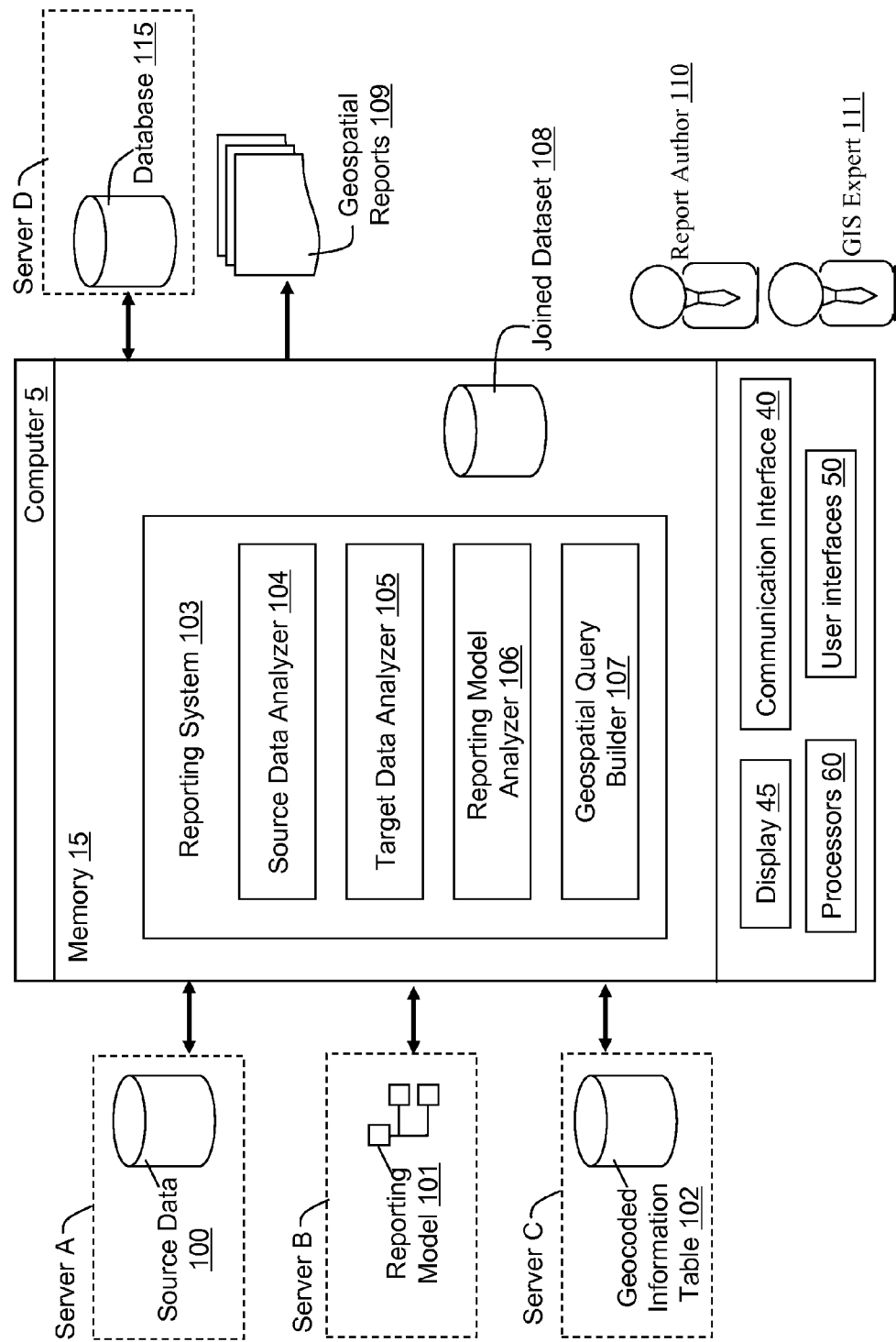
FIG. 1 illustrates a block diagram of a system having various hardware and software elements for implementing example embodiments.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages as well as Web-based programming language or scripting languages such as JavaScript™. Java and all Java-based trademarks and logos are trademarks of Oracle Corporation and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be coupled to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

With reference now to the figures, exemplary diagrams of data processing environments are provided in which illustrative embodiments may be implemented. It should be appreciated that the FIGS. 1-2 are only exemplary and are not intended to assert or imply any limitation with regard to the environments in which different embodiments may be implemented. Many modifications to the depicted environments may be made.

Relational databases use join operations to connect different tables of information. Primary Keys in a source table are typically used to match with Foreign Keys in an external table to form a logical table with elements from both tables. An SQL (structured query language) join operation (i.e., clause) combines records from two or more tables in a database. The join operation creates a set that can be saved as a table or used as is. A join operation is a means for combining fields from two tables by using values common to each.

Consider an example using a CEO Table 1 and Company Table 2:

TABLE 1

CEO Table

| CEOName | Company Id |
|---|---|
| Palmisano | 12 |
| Ballmer | 16 |
| Jobs | 22 |

TABLE 2

| Company Table | |
|---|---|
| CompanyId | Company |
| 22 | Apple |
| 16 | Microsoft |
| 12 | IBM |

When the two Tables 1 and 2 are joined by CompanyId, the outcome is a Result Table 3 that looks like the following:

TABLE 3

| Result Table | | |
|---|---|---|
| CEOName | CompanyId | Company |
| Palmisano | 12 | IBM |
| Ballmer | 16 | Microsoft |
| Jobs | 22 | Apple |

Data is geocoded to associate a geographic position with one or more data elements. Consider an example using a Company Address Table:

TABLE 4

| Company Address Table | |
|---|---|
| CompanyId | Address |
| 12 | 1 New Orchard Road, Armonk, NY, 10504 |
| 16 | 1 Microsoft Way, Redmond, WA, 98052 |
| 22 | 1 Infinite Loop, Cupertino, CA, 95014 |

Geocoding is used to associate a latitude and longitude with each address as shown in Table 5:

TABLE 5

| Geocoded Address Table | | |
|---|---|---|
| Address | Latitude | Longitude |
| 1 New Orchard Road, Armonk, NY, 10504 | 41.109151 | −73.718997 |
| 1 Microsoft Way, Redmond, WA, 98052 | 47.63962 | −122.129949 |
| 1 Infinite Loop, Cupertino, CA, 95014 | 37.33171 | −122.030749 |

The result is set of Tables 4 and 5 that can be joined with traditional SQL queries to create a logical Geocoded Customer Table 6, as shown below:

TABLE 6

| Geocoded Customer Table | | | | | |
|---|---|---|---|---|---|
| CEOName | CompanyId | Company | Address | Latitude | Longitude |
| Palmisano | 12 | IBM | 1 New Orchard Road, Armonk, NY, 10504 | 41.109151 | −73.718997 |
| Ballmer | 16 | Microsoft | 1 Microsoft Way, Redmond, WA, 98052 | 47.63962 | −122.129949 |
| Jobs | 22 | Apple | 1 Infinite Loop, Cupertino, CA, 95014 | 37.33171 | −122.030749 |

Vast amounts of geocoded information (e.g., in geocoded information tables) are provided by governments, public sector corporations, and private sector entities. The type of data provided is often very valuable to business. Examples may include demographics, buying habits, income levels, crime statistics, education levels, public service usage and infrastructure, CRM, drive times, and logistic data.

Geocoded information tables are typically sorted by a geocoded foreign key. In other words, the data is sorted and indexed by some type of location identifier (i.e., foreign key). This allows the content of the geocoded information tables to be joined with traditional business data if the source business data contains an equivalent type of key.

Geocoded information tables use a variety of geocoded foreign keys to allow access to associated data. As included within geocoded information tables, the following are some example of the geocoded foreign key types that may be utilized:

A composite key built from simple latitude and longitude attributes;
Zip code and/or postal code;
Political or voting boundaries;
Municipal districts;
Road boundaries and/or road intersections;
Survey and/or land registry boundaries;
Geographic areas defined by arbitrary polygons, such as census blocks;
Geographic areas defined by arbitrary point and distance measurement; and
Federal information processing standards codes (FIPS codes) which are are a standardized set of numeric and/or alphabetic codes issued by the National Institute of Standards and Technology (NIST) to ensure uniform identification of geographic entities through all federal government agencies.

The entities covered include: states and statistically equivalent entities, counties and statistically equivalent entities, named populated and related location entities (such as, places and county subdivisions).

Business databases and datamarts do not typically have source keys that match any or all of these geocoded foreign key types. Exemplary embodiments are configured to address this problem by using business models in a unique way to match source business data to the vast amounts of information available in Geocoded Information Tables.

Although vendors like Google and Pitney Bowes Business Insight (formerly MapInfo) provide various methods of geocoding data and accessing geocoded data. All of these products require knowledge of Graphical Information Systems (GIS) to gain access to the heart of the information they provided. None provide simple integration with existing, unmodified business data.

Now turning to FIG. 1, FIG. 1 illustrates a block diagram 10 of a system having various hardware and software elements for implementing exemplary embodiments.

The diagram 100 depicts a computer 5 which may be any type of computing device such as a workstation, server, etc. The computer 5 may include and/or be coupled to memory 15, a communication interface 40, a display 45, user interfaces 50, processors 60, and reporting system 103. The communication interface 40 comprises hardware and software for communicating over a network. The user interfaces 50 may include, e.g., a track ball, mouse, pointing device, keyboard, touch screen, etc, for interacting with the computer 5, such as inputting information, making selections, making requests, etc. As discussed for the computer 5, servers A, B, C, and D may also include (similar) elements 15, 40, 45, 50, and 60, which are not shown for conciseness.

The computer 5 includes memory 15 which may be a computer readable storage medium. One or more software applications (modules) such as the reporting system 103 may reside on or be coupled to the memory 15. The reporting system 103 may include various software modules such as a source data analyzer 104, target data analyzer 105, reporting model analyzer 106, and a geospatial query builder 107, where each software module comprises logic and software components to operate and function in accordance with exemplary embodiments in the form of computer executable instructions. The reporting system 103 may also include a graphical user interface (GUI) which the user shown as report author 110 can view and interact with.

The computer 5 may load and/or include a source data 100, a reporting model 101, and a geocoded information table 102. The reporting system 103 is configured to generate a joined dataset 108 in a database which is utilized to produce geospatial reports 109.

The reporting system 103 is configured to automatically join source business data of the business source data 100 (also referred to as source data) transparently with external geocoded information tables 102. The joined dataset 108 may (temporarily) store joins (resulting tables) between source data 100 and geocoded information tables 103. The business source data 100 can be utilized by the reporting system 103 without requiring modification by the report author 110. As a result of the join operation by the reporting system 103, the resulting data in the joined dataset 108 can be utilized to solve reporting problems in many vertical applications, such as, but not limited to, demographics, buying habits, income levels, crime statistics, education levels, public service usage and infrastructure, customer relationship management (CRM), drive times and logistics. A person with typical report authoring skills such as the report author 110 can competently perform this task without requiring assistance from a person with more specialized GIS skills who is represented as the GIS expert 111.

For example, the reporting system 103 is used by the report author 110 to produce geospatial reports 109. The source data 100 is modeled using high level data hierarchies defined in the reporting model 101. These high level data hierarchies in the reporting model 101 make it easier for the report author 110 to generate (write) the geospatial reports 109 since the report author 110 does not need to be concerned with the underlying physical databases and data models used in source data 100 and the geocoded information tables 102.

By the reporting system 103, the source data 100 from a particular business and/or entity is joined with the geocoded information table 102 to create the joined dataset 108 with comprises combined data from both tables 100 and 102. The data in the source data 100 may be compiled and presented in any format which includes tables, matrices, etc. The report system 103 generates the geospatial reports 109 by utilizing data from the joined dataset 108 to produce different visual representations of the joined data as specified by the report author 110.

In the industry, geospatial reports 109 are routinely built for use in the insurance, policing industry, and logistics industries by someone who possesses GIS expert skills such as the GIS expert 111. Due to the high cost of authoring, geospatial reports are not used as widely as they otherwise could in other industries. Relatively few people have GIS expert 111 skills needed to create geospatial reports 109. Such a person must also be skilled in the areas of database query design and business reporting.

Traditionally, a GIS Expert 111 who creates the geospatial report 109 will typically be required to:

1. Handle integration between physical geospatial databases in source data 100 and geocoded information tables 102;

2. Determine to how to match source data with external geocoded keys;

3. Write geospatial queries to extract data from source data 100 and join the source data 100 with geocoded information tables 102; and 4. Author business content in geospatial reports 109.

However, in accordance with exemplary embodiments, the reporting system 103 is configured to effectively automate acts 1-3 above by allowing the report author 110 without GIS Expert 111 skills to competently build and maintain geospatial reports 109.

Consider the following scenario, the report author 110 has general business reporting skills but does not have the specialized skills of the GIS expert 111. The report author 110 wants to utilize data elements from the geocoded information table 102 which is information broken down by some geographical location. Data elements of the geocoded information table 102 will typically include but are not meant to be limited to demographics, buying habits, income levels, crime statistics, education levels, public service usage and infrastructure, CRM, drive times and logistics. Since the report author 110 lacks GIS expert 111 skills, the report author 110 does not know how to directly access geocoded information table 102 data, e.g., utilizing specialized queries. A geocoded table will typically have a primary key associated with a particular geospatial area or shape file. Examples are population keyed by census block, and average income keyed by county or average age in a region bounded by a set of 4 or more city streets. To query such a geocoded table, the GIS expert 111 will need to build specialized query clauses and parameters that reference the associated GIS objects in a geospatial data base system. Furthermore, since these objects will not typically exist in common business data, the GIS expert 111 will need to convert and possibly aggregate intermediate results to produce a valid result set. For example, given a source street address and a target geocoded population table keyed by census block, the GIS expert 111 will need to construct a geospatial query to determine which census block contains the source street address and then query the target population table with the census block identifier found. Furthermore, if the format of the census block identifier found differs from the target key, the census block identifier will need to be transformed to match the target key format. For example, the source identifier may be in the format nnnn nn and the target format could be in the format nnnn nn. Without requiring the expert skills like the GIS expert 111, exemplary embodiments are configured such that the report author 110 can utilize the reporting system 103 to produce various geospatial reports 109.

The reporting system 103 may include normal elements of a general purpose reporting system, like that provided by IBM Cognos® Software and others. However, the reporting system 130 is additionally configured to operate and function as discussed herein.

The reporting system 103 is configured to receive and load the reporting model 101 which is a high level representation of data hierarchies, and the reporting model 101 hides physical database implementation details from the report author 110. The reporting model 101 may represent and/or include various types of business models that correspond to the source data 100. The reporting model 101 is a business oriented hierarchy that shows the hierarchal structure of different terms (e.g., any type of data that may be organized) for a business or enterprise, and the reporting model 101 informs the reporting system 103 that the corresponding source data 100 is a hierarchy of the related terms in table(s) of the source data 100. So, although the source data 100 may be in table format, reporting system 103 is configured to obtain a hierarchical structure for the source data 100 and align the source data 100 to the hierarchical structure of the reporting model 101 as shown in FIGS. 2 and 4. Also, the reporting model 101 includes but is not limited to various hierarchical (business) models, such as sales regions models, supplier location models, etc. The reporting model 101 may be a more general model such as the information framework (IFW) model. In other words, many different reporting models 101 having many different hierarchical structures are available for use by the reporting system 103 to build source data hierarchies as illustrated in FIGS. 2 and 4. Further, the reporting model 101 may be a metadata model which describes source data 100 relationships.

For ease of understanding and not limitation, features of the reporting system 103 may be explained by utilizing its various software modules but it is understood that (part or all of) the software modules may be integrated in the reporting system 103 and/or separate from the reporting system 103 as desired. The source data analyzer 104 is configured to read the source data 100 to determine the data types and data formats of source data elements. The source data analyzer 104 may be configured with a lexical parser to identify and select data fields in the tables of the source data 100 which look like geospatial data, e.g., the source data analyzer 104 may identify and select addresses, names of states, part numbers, etc. These data elements or terms will be utilized later to build hierarchies which show parent and child relationships for the source data 100. The source data analyzer 104 is configured to identify and select any type of data format that appears to be a geospatial element, i.e., a term that has location information. The source data analyzer 104 may find a series of numbers in the right location in a table of the source data 100. For example, the source analyzer 104 may find a telephone number, where the first three numbers are an area code, the second three numbers are a state code, and the last four numbers are a point location for that telephone number. The source analyzer 104 can perform a look-up in, e.g., database 115 to determine which state the telephone number corresponds to. Also, the source data analyzer 104 of the reporting system 103 may find and select a term such as Jefferson and/or a state name from within a table of the source data 100. In one implementation of exemplary embodiments, the source data analyzer 104 may want to confirm that the term Jefferson is in fact geospatial data. Accordingly, the source data analyzer 104 is configured to perform a look-up in the database 115 and/or perform a look-up in the geocoded information table 102 to confirm that the term Jefferson is in fact a county (or maybe a district, city, etc.) of a particular state. The terms in the source data 100 identified by the source data analyzer 104 are also candidates terms for joins to the geocoded information table 102.

Moreover, the source data analyzer 104 reads the reporting model 101 to characterize, identify, and/or select source data elements (terms) (aligned to the business model of the reporting model 101) that are appropriate for geospatial data joins. Multiple terms may be selected in the source data 100 as being appropriate for data joins. The selected terms may be utilized as primary keys. As discussed further below, the reporting model analyzer 106 will automatically align the source data 100 to the hierarchy of the reporting model 101. As automatically performed by the source data analyzer 104, selection criteria for candidate geospatial elements (terms) in the source data 100 and/or reporting model 101 include but are not limited to: latitude and longitude values; place names like country, city, and county; online analytical processing (OLAP) dimensions that hold location information; address elements such as street numbers, street names, post office box, post office numbers, router numbers, etc.; zip code and postal codes; municipal lot coordinates; and named geographic regions like 'polling/electoral district', 'police precinct districts' and/or 'neighborhood names'; and FIPS code (US), all of which may be present in one or more geocoded information tables 102.

The target data analyzer 105 is configured to read the geocoded information table 102 to characterize and select (elements) terms in the geocoded information table 102 that are appropriate as targets of geocoded data joins. The targets are the keys (also referred to as database keys or foreign keys) in the geocoded information table 102 for joining to the geocoded information table 102. The same or similar selection criteria discussed above for identifying terms in the source data 100 and/or the reporting module 101 may be utilized to identify and select geospatial (elements) terms in the geocoded information table 102. The target data analyzer 105 is configured to determine if there is a match between the automatically selected terms (i.e., primary keys) in the source data 100 to the selected terms (i.e., foreign keys) in the geocoded information table 102. For each match found between the selected terms in the source data 100 and the selected terms in the geocoded information table 102, the corresponding tables (in the source data 100 and the geocoded information table 102) for the matching selected terms are joined, e.g., in the joined dataset 108.

The reporting model 101 is extended with high level data (in a hierarchical structure) that represents the selected terms (e.g., elements or data) from the source data 100 analyzed by the source data analyzer 104. The reporting model analyzer 106 is configured to read the reporting model 101 to determine containment relationships, level attributes, and physical database attributes. For example, model dimensions of the reporting model 101 may provide hierarchies and attributes like that shown in FIG. 2.

FIG. 2 illustrates an example of a source data hierarchy 200 based on the reporting model 101 in accordance with exemplary embodiments. In this example, the reporting model 101 is a business model which includes the business's hierarchy, and this hierarchy is aligned to the source data 100 (by the reporting model analyzer 106) to form what can be referred to as the source data hierarchy 200. For example, the reporting model analyzer 106 is configured to extend the reporting model 101 by generating the source data hierarchy 200, and the reporting model analyzer 106 is configured to align (e.g., in rows) the reporting model 101 hierarchy to the selected terms of the source data 100. In FIG. 2, a hierarchy column 205 illustrates the hierarchical structure of the (original) reporting model 101. A level column 210 shows different levels of the hierarchy column 205, where the top level of the hierarchy 205 is level 0 and the lowest level is level 5. A source table column 215 shows the corresponding, e.g., source business data (which is sales data in this example) from the source data 100 in the same hierarchical relationship as the reporting model 101 comprises in hierarchy column 205. When generating the source data hierarchy 200, the reporting model analyzer 106 can correspond each term of the source data 100 to the hierarchy 205 and level 210 of the reporting model 102, and display (e.g., on the display 45) the source data hierarchy 200 for the report author 110. In one implementation, the reporting model analyzer 106 reads the reporting model 101 to get metadata (i.e. data about the data) for the source data 100. This metadata will typically define container relationships for aggregation of database columns or fields, and the metadata can also define simple parent-child relationships and "is a" hierarchy. FIG. 4 shows a typical containment and/or "is a" hierarchy along with source data 100 column names to use for queries. For example, when building a report by 'states', the reporting model analyzer 106 is configured to aggregate values collected for 'cities' in an associated query. In a similar fashion, the reporting model analyzer 106 is configured to know how to aggregate 'states' into a 'region' and 'regions' into a 'country according to exemplary embodiments.

Via the user interface 50, the report author 110 may instruct the reporting system 103 to join the various different terms (elements) from the source data 100 (corresponding to the reporting model 101) to the geocoded information table 102. Additionally and/or alternatively, the reporting system 103 is configured to automatically join the various different terms (elements) from the source data 100 (corresponding to the reporting model 101) to the geocoded information table 102. Since the reporting model 101 is now linked to the source data 100 as shown in the source data hierarchy 200 in FIG. 2, the source data 100 is joined to the geocoded information table 102 to take advantage of the hierarchical structure in column 205. When (for the join operation) source data is from the source data 100 and target data is from the geocoded information table 102, the geospatial query builder 107 will be launched to retrieve the requested data for the join operation. The result of joining the source data 100 which is aligned to the reporting model 101 with the target data of the geocoded information table 102 is placed in a joined dataset 108.

The geospatial query builder 107 is configured to move up and down the hierarchy column 205 of the reporting model 101 (which in turn moves up and down the source table column 215), and the geospatial query builder 107 is configured to manipulate the source data 100 based on the hierarchy 205 of the reporting model 101.

Referring to FIG. 2, in the hierarchy column 205, "country" contains "state and/or province". This means that "country" is the parent of "state and/or province", and also means that "state and/or province" is the child of "country". "State/province" contains "county", which means that "state/province" is the parent of "county" and that "county" is the child of "state/province". The hierarchy 205 continues until we reach "customers" which contains has an "address", and this means that "customers" is the parent of "address" and "address" is the child of "customers". These are the containment relationships of the hierarchy 205 and the 'has' relationships (for all elements except "customers" to "address" which is a non-aggregating relationship), and the same containment relationships and 'has' relationships re applied to the source data 100 by the reporting model analyzer 106 as shown in column 215. In other words, "sales.county" such as U.S. contains many different "sales.states" such as Alabama, Alaska . . . New York, etc. Each "sales.state" contains "sales.county", where there may be various different sales counties. Each "sales.county" contains "sales.city" which may be the various cities that make up the particular sales county. Each "sales.city" contains "customers.customer" which are the different names/identifications of the customers who are in the particular sales city. Finally, in the hierarchy of the source data 100 in column 215, "customers.customer" has "customers.address" which are the addresses of each customer named in "customers.customer". Each entry in the source table.column 215 is the corresponding data designated in that entry. For example, each entry in source table.column 215 can comprise numerous source data 100 that is in the particular entry, such as "sales.city". Additionally, and/or alternatively, each entry in the source table.column 215 can be linked to a particular table for that entry. For example, "sales.city" may be linked to a table in the source data 100 that comprises all of the corresponding sales cities.

Also note that for the reporting models 101 there may be two types of parent-child relationships such as, e.g., 'contains' relationships which generally aggregate child elements, and also 'has' relationships which do not generally aggregate. Aggregation is generally allowed (by a geospatial query builder 108 discussed herein) when the parent-child relationship in the reporting model 101 is a 'contains' relationship (for example, when State contains City). Relationships of type 'has' (for example Customer 'has' Address) are generally not aggregated.

Figure 3:
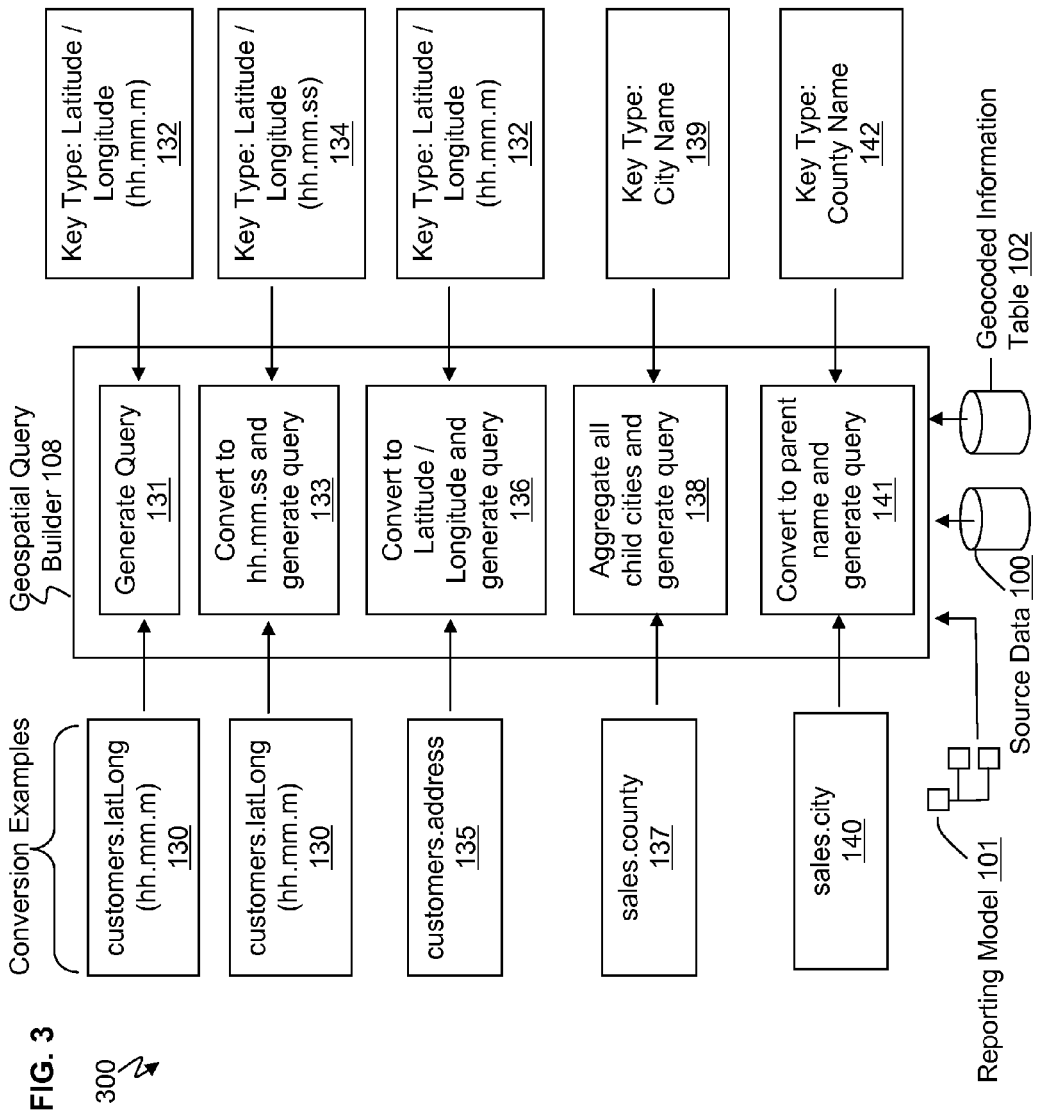
FIG. 3 illustrates processing examples according to example embodiments.

Turning to FIG. 3, FIG. 3 illustrates some example of geospatial query builder 107 processing in accordance with exemplary embodiments. The geospatial query builder 107 is configured to receive input from the source data 100, the report model 101, and the geocoded information table 102, and then build queries to provide an output (which is included in or part of the geospatial report 109) even when the term(s) of the source data 100 (requested by the report author 110 for inclusion in the geospatial report 109) is a different type than the term(s) of the geocoded information table 102 and when the requested term(s) of the source data 100 cannot be used for direct (primary key to foreign key) indexing and/or join operations.

When source data of the source data 100 and target data of the geocoded information table 102 are the same geospatial type and geospatial format, database queries (to the source data 100 database and to the geocoded information table 102 database) are directly generated by the geospatial query builder 107, and the reporting system 103 utilizes the results of the queries to generate the geospatial report 109 by combining the business data of the source data 100 with the corresponding data of in the geocoded information table 102. For example, source customers.latLong (hh.mm.m) 130 is the same type and format as key type: Latitude/Longitude (hh.mm.m) 132. The geospatial query builder 107 is configured to generate query 131 to extract the geospatial data 132 of the geocoded information table 102 that corresponds to the source 130 of the source data 100. The reporting system 103 included this extracted geospatial data 132 in the geospatial report 109.

When source (source data 100) and target data (geocoded information table 102) are the same geospatial type but different geospatial format, the source type is converted and database queries are then generated by the geospatial query builder 107. For example, when source customers.latLong (hh.mm.m) 130 is the same type but different format as key type: latitude/longitude (hh.mm.ss) 132, the geospatial query builder 107 is configured to convert the source 130 to hh.mm.ss and generate query 136. The query 136 will extract the geospatial data 132 from the geocoded information table 102 that corresponds to the source 130 of the source data 100, to be included in generating the geospatial report 109.

When source and target data are different geospatial types, the geospatial query builder 107 is configured to substitute alternate parent and/or child members from the (business model) source data hierarchy 200 (or 400 discussed below) and utilize these alternate parent and/or child members to build a query. Examples are described below.

The first example is conversion at the same level (such as hierarchical level 210 in FIG. 2) in the reporting model 101 hierarchy shown in the source data hierarchy 200 of FIG. 2. "Customers.address" 135 is a string type that holds a text address. Key type: "latitude/longitude" (hh.mm.m) 132 is latitude/longitude in hh.mm.m format. Because "customers.address" 135 is leaf member in the reporting model 101 hierarchy (in the source column 215), the geospatial query builder 107 will not aggregate children and can therefore convert to latitude/longitude and generate query 136. Consider a scenario of an address element (such as "customers.address") which is geospatial point which is handled as follows. Text street address values from the "customers.address" database column are geocoded to produce a geospatial point expressed as a latitude/longitude coordinate pair for each address value. This coordinate pair can be used to directly query any target data source that is keyed by geospatial point where only coordinate format conversion (such as hh.mm.m to hh mm ss) is optionally needed. When the target data source is keyed by a geospatial area and not a simple point or two geospatial areas that do not coincide, conversion to a matching geospatial area is needed and can be accomplished by the geospatial query builder 108. This type of conversion is possible (by the geospatial query builder 108) when the target geospatial area is associated with a parent element in the reporting model 101. For example, an 'address' has geospatial parents 'cities' and 'states'. Any of these geospatial keys may be used when the associated area contains the source coordinate pair. For example, the State='Texas' may be used when the source coordinate pair is determined to be located 'in' the geospatial area named "Texas". A similar operation works for different area where one is completely contained within a parent.

The second example is conversion to child members (elements) in the source data hierarchy 200. "Sales.county" 137 is a string type that holds a text county name. Key type: "city name" 139 is a text city name. Because "sales.county" contains "sales.city" in its hierarchy (in FIG. 2), the geospatial query builder 107 is configured to aggregate all child cities of "sales.county" and generate query 138. Query 138 (having all the child cities equating to "sales.city") is utilized by the reporting system 103 to extract the corresponding data for "city name" 139 from the geocoded information table 102 to generate the geospatial report 109.

The third example is conversion to parent members (elements) in the source data hierarchy 200 shown in FIG. 2. "Sales.city" 140 is a string type that holds a text city name. Key Type: "county name" 142 is a text county name in the geocoded information table 102. Because "sales.county" is the parent of "sales.city" in its hierarchy (in FIG. 2), the geospatial query builder 107 is configured to convert to parent name ("sales.county") and generate query 141 using the parent name. The query 141 (of the parent county) is utilized by the reporting system 130 to extract the corresponding data for "county name" 142 in the geocoded information table 102.

Each of the conversions described in the examples above is applicable to the hundreds of formats that exist in geospatial systems. By this process, conversions are handled automatically in the reporting system 103 using the reporting model 101 to arbitrate which conversions are valid.

As discussed above, database keys (i.e., terms) for joining geospatial data are automatically generated by the geospatial query builder 107 based on the key's relative position in the source data hierarchy 200 which is based on the reporting model 101 hierarchy. As shown in FIG. 2, consider the reporting model 101 with the hierarchy below:

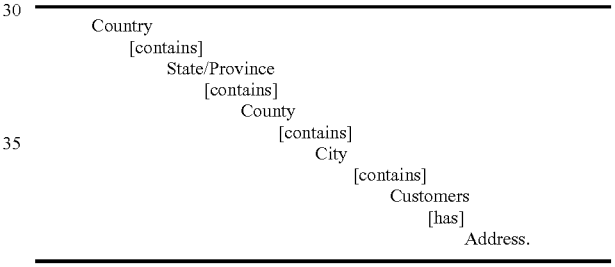

Via the geospatial query builder 107 of the reporting system 103, this reporting model 101 hierarchy can be used to convert child member (elements) to parent members (elements) when a target table (of the geospatial information table 102) is keyed by a parent (element) member identifier of the source data 100.

Here are some further examples of the type of automatic conversions that can be applied by the geospatial query builder 107 when the following relationships are obtained from the dimensional reporting model of the source data hierarchy 200. For example, assume that Customer "A" lives at Address "V" in City "W" in County "X" in State "Y" in Country "Z".

References to Customer A can use Address V to create latitude/longitude AA for that address, by the geospatial query builder 107. For example, the geospatial query builder 107 may look up the latitude/longitude for the Address V. The geospatial query builder 107 can utilize the resulting latitude/longitude AA to join with the geocoded information table 102 when the geocoded information table 102 is keyed by latitude/longitude. Also, the geospatial query builder 107 is configured to automatically convert between different latitude/longitude formats. For example, the geospatial query builder 107 can convert between hhh.mm.mmm to hh°mm'ss" {N|S|E|W}. The geospatial query builder 107 is configured to automatically convert between a latitude/longitude to an address (i.e., reverse geocoding) which can then be utilized as a key for any geocoded information table 102 keyed by address. The geospatial query builder 107 is configured to automatically convert between different address formats. The geospatial query builder 107 is configured to automatically convert between different name and/or alias formats. For example, the geospatial query builder 107 is configured to recognize that California is equivalent to CA in the appropriate context, e.g., by performing a look-up of CA in the database 115.

By the geospatial query builder 107 traversing up the source table.column 215 of the source data hierarchy 200, references to Customer A can use any parent member value when the geocoded information table 102 is keyed by that parent member value. Suppose the desired information in the source data 100 for generating the geospatial report 109 is a child member that is not a primary key, the geocoded query builder 107 is configured to traverse up the source data hierarchy 200 to find a parent member that can be utilized as a key for the geocoded information table 102. For example, Customer A can be automatically joined to external tables of the geocoded information table 102 (by the geospatial query builder 107) where the specific locator key is City=W, County=X, State=Y and/or Country=Z, even if the report author 110 requests geospatial information (from table 102) for Customer A (which represents a plurality of customers) by the name of Customer A but Customer A's name is not a key for the geocoded information table 102.

Also, the geospatial query builder 107 is configured to convert parent members (elements) downward to child members (that are geocoded elements), which can be utilized as a key for the geocoded information table 102. This is because the parent member (which is requested by the report author 110 to be utilized in the geospatial report 109) is not a primary key that can be utilized to join to the geocoded information table 102. For example City=W, County=X, State=Y and/or Country=Z can be converted to the latitude/longitude (by the geospatial query builder 107) at their geographic center when the geocoded information table is keyed by latitude/longitude.

As mentioned herein, the geospatial query builder 107 is configured to aggregate all contained children (of a parent member) when the geocoded information table 102 is keyed by that child member value. For example, State=Y becomes the union of all contained Counties={X1, X2, X3, ... Xn}, by the geospatial query builder 107 when the geospatial information table 107 is keyed by counties.

Further, any of the above conversions can be used to optionally add geospatial point and distance calculations. For example, the geospatial query builder 107 is configured to request latitude/longitude position+radius of 5 miles, to request within 3 miles of the outer edges of City W, to request all Counties adjacent to County X, etc.

Since the target data analyzer 105 is configured to find in the geocoded information table 102 all potential terms that can be utilized as (foreign) keys for joining to the geocoded information table 102, the geospatial query builder 107 can move up and down the source data hierarchy 200 relationships to find an appropriate matching (primary) key in the source data 100. The reporting model analyzer 106 builds the source data hierarchy 200 by corresponding (aligning) the source data 100 to the hierarchical structure of the reporting model 101. The source data hierarchy 200 allows hierarchical relationships in the source data 100 to be determined by the geospatial query builder 107, and without the source data hierarchy 200, the geospatial query builder 107 would not have recognized the parent and child relationships which allow for conversion.

FIG. 4 is another example of a source data hierarchy 400 automatically created by the reporting model analyzer 106 based on the reporting model 101 in accordance with exemplary embodiments. In the reporting model 101 of the source data hierarchy 400, the hierarchy column 405 illustrates that "Country" contains "Region", which contains "States", which contains "Cities", which contains "Customer", which has "Address". The reporting model analyzer 106, e.g., in conjunction with the source data analyzer 104, is configured to automatically align source data for the source data 100 to each level of the hierarchical structure of the reporting model 101, so that containment relationships (i.e., parent and child relationships) can be exploited by the geospatial query builder 107. For example, the report author 110 may instruct the geospatial query builder 107 to add up sales for all customers in the eastern region, which is "eastern sales.region", and provide income data of the customers in the "eastern sales.region". The geospatial income data is in the geocoded information table 102 but the geocoded information table 102 is not keyed by the eastern region, western region, and/or any region. However, the report author 110 has that the geospatial report 109 be generated to provide income data for customers in the "eastern sales.region".

Whenever the geocoded information table 102 is keyed by terms that are not what is requested by the report author 110, the geospatial query builder 107 is configured to automatically convert the terms of the source data 100 to the key(s) in the geocoded information table 102 by traversing up and down the source data hierarchy 400, and then with the extracted data, the geospatial query builder 107 generates the geospatial report 109 as requested. Assume that the geocoded information table 102 is keyed by city as determined by the target data analyzer 105 because the target data analyzer 105 previously parsed the geocoded information table 102 to find all potential target (foreign) keys. The source data analyzer 104 determines that "sales.city" is a primary key (term) in the source data 100. Accordingly, the geospatial query builder 107 automatically joins "sales.city" (i.e., the city or cities it represents) to the cities (foreign keys) in the geocoded information table 102. Now, based on the "eastern sales.region" containing "eastern sales.states" in the source data hierarchy 400, the geospatial query builder 107 is configured to aggregate all the individual "eastern sales.states", which may be, e.g., New York, New Jersey, Virginia, etc. Based on the "eastern sales.states" containing "eastern sales.cities", the geospatial query builder 107 is configured to aggregate all the individual sales cities in New York, New Jersey, Virginia, etc., and the individual sales cities may be J, K, L, M, and N. Once all of the individual cities have been aggregated, the geospatial query builder 107 is configured to extract geospatial data (which is geospatial income data in this example) for each individual city from the joined geospatial income table 102. This geospatial income data (for each "eastern sales.city") is included in the geospatial report 109 for the "eastern sales.region" even though the geocoded information table 102 is not keyed by "eastern sales.region". Since "eastern sales.region" could be any arbitrary grouping of geographic locations, the geospatial query builder 107 is configured to determine a child member for this arbitrary grouping, and the child member can be one or more keys for the geocoded information table 102.

A further feature of exemplary embodiments is that since the reporting system 103 utilizes the reporting model 101 to align source data 100 to the hierarchical structure in the reporting model 101, data does not have to be categorized up front when input into the source data 100 database. The many different "customers.address" can be input without having to identify, e.g., "eastern sales.region" as opposed to a "western sales.region" or a "southern sales.region". For example, the geospatial query builder 107 is configured to parse an individual address for a customer and determine which sales city the customer is located in. The geospatial query builder 107 (in conjunction with the source data analyzer 104) can parse source data 100 to determine "eastern sales.cities" and recognize that this customer is in an "eastern sales.city", and the source data hierarchy 400 informs the geospatial query builder 107 that "eastern sales.cities" are contained in an "eastern sales.region". If, e.g., the "eastern sales.region" happens to change to the "southern sales.region" as a business decision, each individual customer does not have to be re-categorized as "southern sales.region". Instead, "eastern sales.region" can be replaced with "southern sales.region" in the source.table column 415, such that each customer previously in the "eastern sales.region" will now be aggregated in the "southern sales.region" by the geospatial query builder 107.

Figure 5:
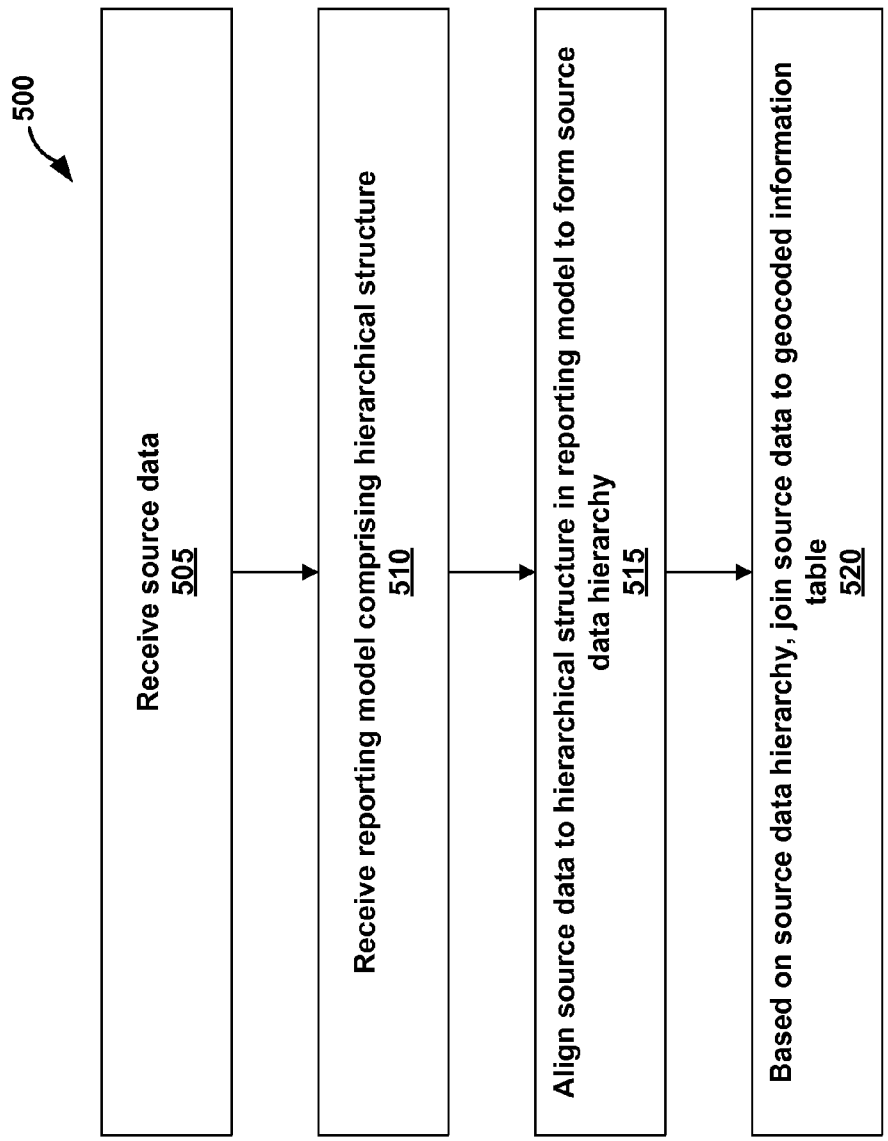
FIG. 5 illustrates a method according to example embodiments.

FIG. 5 illustrates a method 500 for automatically performing join operations to generate geospatial reports 109 in accordance with exemplary embodiments. At operation 505, the reporting system 103 receives source data 100. At operation 510, the reporting system 103 receives the reporting model 101, and the reporting model 101 comprises a hierarchical structure. At operation 515, the reporting system 103 aligns the source data 100 to the hierarchical structure in the reporting model 101 to form a source data hierarchy (such as, e.g., the source data hierarchy 200 and/or 400). At operation 520, based on the source data hierarchy, the reporting system 103 joins the source data 100 to the geocoded information table 102. By this join of the source data 100 to the geocoded information table 102, the reporting system 103 can utilize the geospatial data from the geocoded information table 102 in generating a geospatial report 109 for the source data 100.

Figure 6:
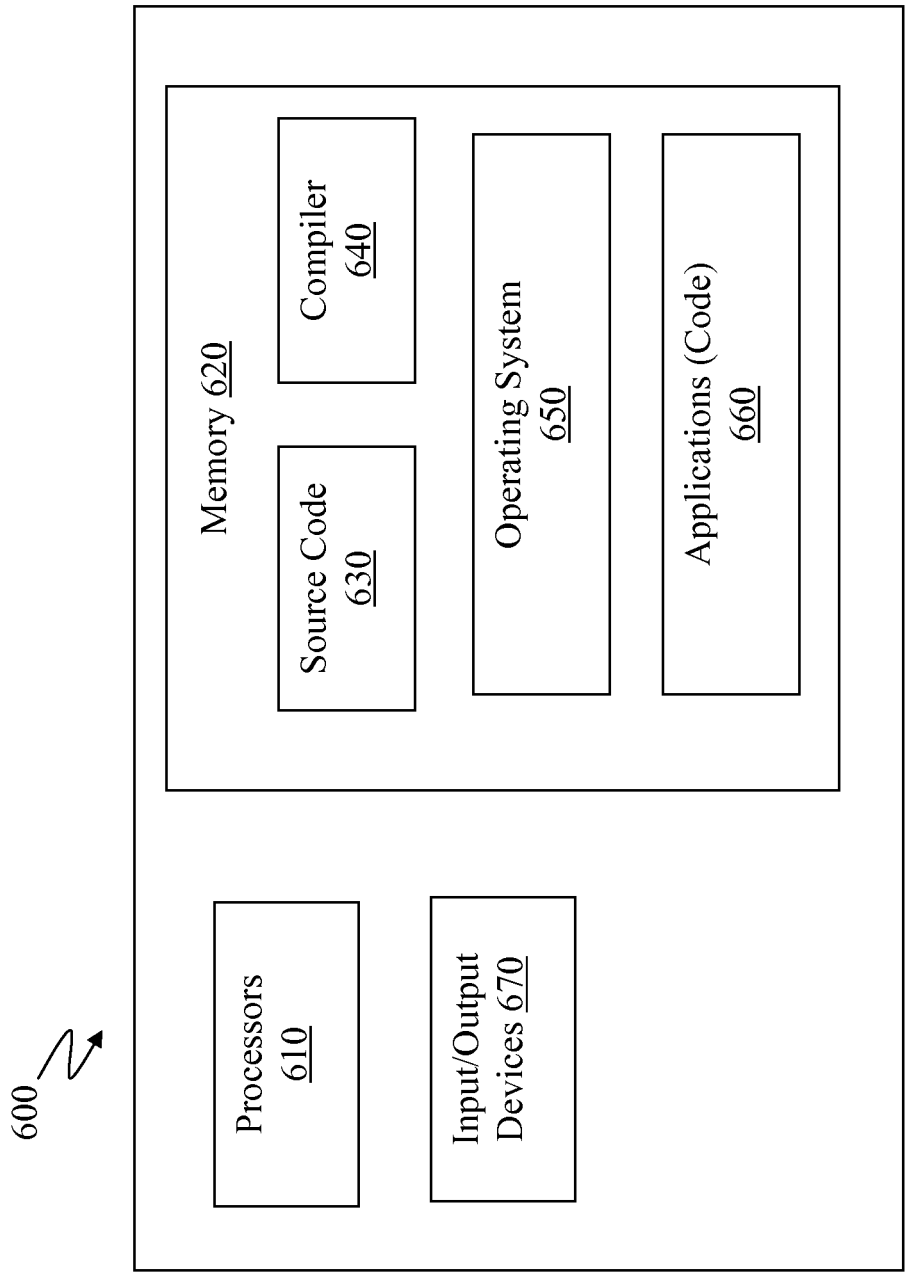
FIG. 6 illustrates an example of a computer having capabilities, which may be included in example embodiments.
Figure 7:
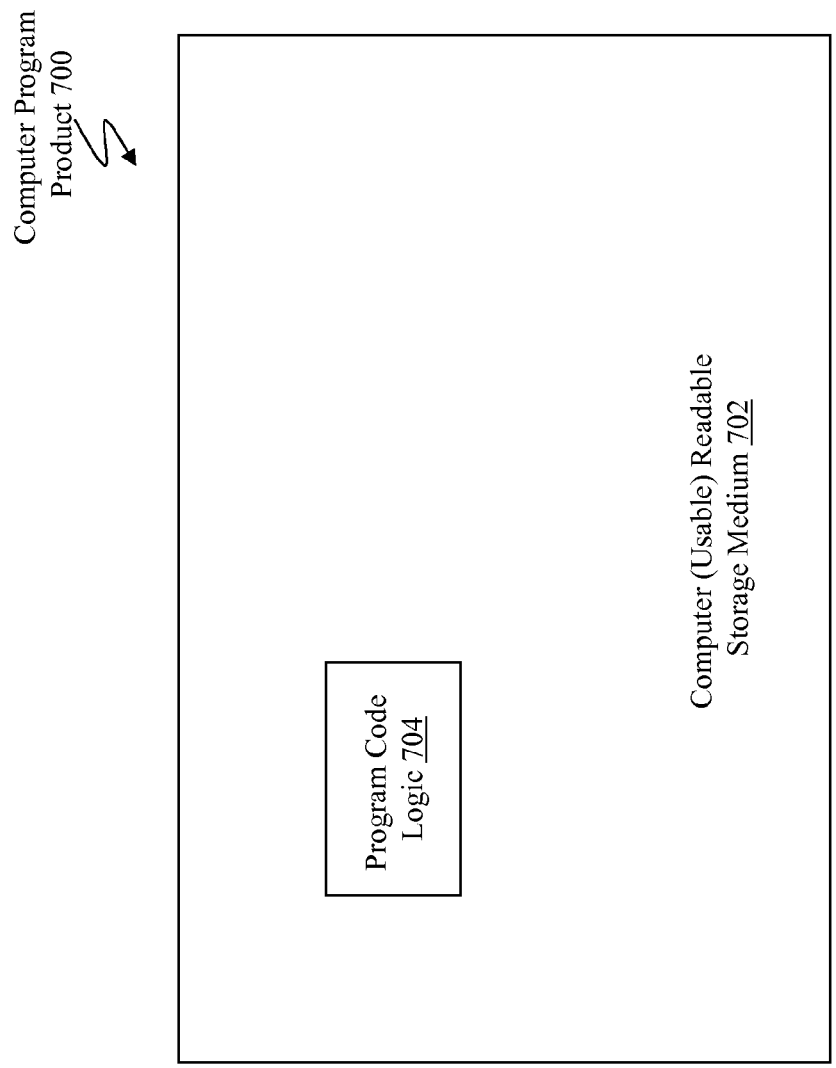
FIG. 7 illustrates a computer program product on a computer readable storage (usable) medium according to example embodiments.

FIG. 6 illustrates an example of a computer 600 having capabilities, which may be included in exemplary embodiments. Various methods, procedures, modules, flow diagrams, tools, application, and techniques discussed herein may also incorporate and/or utilize the capabilities of the computer 600. Moreover, capabilities of the computer 600 may be utilized to implement features of exemplary embodiments discussed herein. One or more of the capabilities of the computer 600 may implement any element discussed herein, including the computer 5 and/or the servers A, B, C, and D.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 105 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

The flow diagrams depicted herein are just one example. There may be many variations to this diagram or the acts (or operations) described therein without departing from the spirit of the invention. For instance, the acts may be performed in a differing order or acts may be added, deleted or modified.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of various aspects of the present invention have been presented for purposes of illustration and description, but is not intended to be exhaustive or limited to the invention in the form disclosed. Many modifications and variations will be apparent to those of ordinary skill in the art without departing from the scope and spirit of the invention.

Aspects of the invention can take the form of an entirely hardware embodiment, an entirely software embodiment or an embodiment containing both hardware and software elements. One embodiment is implemented in software, which includes but is not limited to firmware, resident software, microcode, and other software media that may be recognized by one skilled in the art.

While certain aspects of the present invention have been described in the context of a fully functioning data processing system, those of ordinary skill in the art will appreciate that the processes of various aspects of the present invention are capable of being distributed in the form of a computer readable medium of instructions and a variety of forms, regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The invention claimed is:

1. A method comprising:
receiving source data comprising one or more source data elements of a database, wherein at least one first category of the source data comprises respective source address information for each of the one or more source data elements and wherein at least one second category of the source data comprises respective entity information for each of the one or more source data elements;
receiving target data comprising a geocoded information table that includes one or more target data elements, wherein at least one first category of the target data comprises respective geocode information for each of the one or more target data elements, the respective geocode information defining a respective geographic location for each of the one or more target data elements, and wherein at least one second category of the target data comprises respective census data for the respective geographic location for each of the one or more target data elements, wherein the target data is different from the source data;

receiving a metadata model, wherein the metadata model defines a hierarchical structure of categories of the source data;

aligning, by a computing device comprising one or more processors, the source data to the hierarchical structure defined in the metadata model to form a source data hierarchy;

generating, by the computing device, for at least one source data element from the one or more source data elements, a query to obtain information from the at least one second category of the one or more target data elements based at least in part on (i) the respective source address information for the at least one source data element, (ii) the source data hierarchy, and (iii) the respective geocode information for each of the one or more target data elements;

responsive to generating the query, joining, by the computing device, the at least one second category of the at least one source data element with the information from the at least one second category of the one or more target data elements to form a joined dataset, wherein the joined dataset comprises the at least one second category of the at least one source data element combined with the information from the at least one second category of the one or more target data elements; and generating, by the computing device and based at least in part on the joined dataset, a geospatial report.

2. The method of claim 1, wherein aligning the source data to the hierarchical structure defined in the metadata model to form the source data hierarchy comprises:

parsing the metadata model to determine the hierarchical structure; and corresponding the categories of the source data to the hierarchical structure defined in the metadata model to form the source data hierarchy, such that the categories of the source data in the source data hierarchy have a containment relationship as defined by the hierarchical structure of the metadata model.

3. The method of claim 1, wherein the respective census data comprises data representing at least one of: respective demographic data for the respective geographic location, respective income level data for the respective geographic location, respective crime data for the respective geographic location, respective education data for the respective geographic location, and respective public service usage data for the respective geographic location.

4. The method of claim 1, wherein generating the query to obtain the information from the at least one second category of the one or more target data elements comprises:

determining whether a type of a particular first category from the at least one first category of the source data is the same as a type of the at least one first category of the target data; and responsive to determining that the type of the particular first category of the source data is the same as the type of the at least one first category of the target data, generating the query to obtain the information from the at least one second category of a target data element from the one or more target data elements, wherein the at least one first category of the target data element comprises geocode information defining a geographic location that is the same as a geographic location defined by the respective source address information in the particular first category of the at least one source data element.

5. The method of claim 4, wherein the type of the at least one first category of the target data comprises one of: a geographic location, a geographic area defined by a polygon shape, or a geographic area defined by the geographic location and a distance measurement.

6. The method of claim 5, wherein the geographic location comprises a combination of a latitude attribute and a longitude attribute.

7. The method of claim 1, wherein generating the query to obtain the information from the at least one second category of the one or more target data elements comprises:

determining whether a type of a particular first category from the at least one first category of the source data is the same as a type of the at least one first category of the target data;

responsive to determining that the type of the particular first category of the source data is the same as the type of the at least one first category of the target data, determining whether a format of the particular first category is the same as a format of the at least one first category of the target data;

responsive to determining that the format of the particular first category of the source data is not the same as the format of the at least one first category of the target data, converting the respective source address information in the particular first category of the at least one source data element to the format of the at least one first category of the target data to obtain converted source address information corresponding to the respective source address information in the particular first category of the at least one source data element; and generating the query to obtain the information from the at least one second category of a target data element from the one or more target data elements, wherein the at least one first category of the target data element comprises geocode information defining a geographic location that is the same as a geographic location defined by the converted source address information.

8. The method of claim 7, wherein the type of the at least one first category of the target data comprises one of: a geographic location, a geographic area defined by a polygon shape, or a geographic area defined by a location and a distance measurement.

9. The method of claim 8, wherein the geographic location comprises a combination of a latitude attribute and a longitude attribute.

10. The method of claim 1, wherein the at least one first category of the source data comprises a plurality of first categories of the source data, and wherein generating the query to obtain the information from the at least one second category of the one or more target data elements comprises:

determining whether a type of a particular first category from the plurality of first categories of the source data is the same as a type of the at least one first category of the target data;

responsive to determining that the type of the particular first category of the source data is not the same as the type of the at least one first category of the target data, determining, based at least in part on the source data hierarchy, a parent first category from the plurality of first categories of the source data, wherein the parent first category is a parent of the particular first category;

determining whether a type of the parent first category is the same as the type of the at least one first category of the target data; and responsive to determining that the type of the parent first category is the same as the type of the at least one first category of the target data, generating the query to obtain the information from the at least one second category of a target data element from the one or more target data elements, wherein the at least one first category of the target data element comprises geocode information defining a geographic location that is the same as a geographic location defined by the parent first category of the at least one source data element.

11. The method of claim 10, wherein the type of the at least one first category of the target data comprises one of: a geographic location, a geographic area defined by a polygon shape, or a geographic area defined by a location and a distance measurement.

12. The method of claim 11, wherein the geographic location comprises a combination of a latitude attribute and a longitude attribute.

13. A device comprising:
a memory to store computer-executable instructions; and
a processor coupled to the memory,
wherein the processor, upon execution of the computer-executable instructions, performs operations to:
receive source data comprising one or more source data elements of a database, wherein at least one first category of the source data comprises respective source address information for each of the one or more source data elements and wherein at least one second category of the source data comprises respective entity information for each of the one or more source data elements;
receive target data comprising a geocoded information table that includes one or more target data elements, wherein at least one first category of the target data comprises respective geocode information for each of the one or more target data elements, the respective geocode information defining a respective geographic location for each of the one or more target data elements, and wherein at least one second category of the target data comprises respective census data for the respective geographic location for each of the one or more target data elements, wherein the target data is different from the source data;
receive a metadata model, wherein the metadata model defines a hierarchical structure of categories of the source data;
align the source data to the hierarchical structure defined in the metadata model to form a source data hierarchy;
generate, for at least one source data element from the one or more source data elements, a query to obtain information from the at least one second category of the one or more target data elements based at least in part on (i) the respective source address information for the at least one source data element, (ii) the source data hierarchy, and (iii) the respective geocode information for each of the one or more target data elements;
responsive to generating the query, join the at least one second category of the at least one source data element with the information from the at least one second category of the one or more target data elements to form a joined dataset, wherein the joined dataset comprises the at least one second category of the at least one source data element combined with the information from the at least one second category of the one or more target data elements; and
generate, based at least in part on the joined dataset, a geospatial report.

14. The device of claim 13, wherein the processor further performs operations to align the source data to the hierarchical structure defined in the metadata model to form the source data hierarchy at least by:
parsing the metadata model to determine the hierarchical structure; and
corresponding the categories of the source data to the hierarchical structure defined in the metadata model to form the source data hierarchy, such that the categories of the source data in the source data hierarchy have a containment relationship as defined by the hierarchical structure of the metadata model.

15. The device of claim 13, wherein the processor performs the operations to generate the query to obtain the information from the at least one second category of the one or more target data elements at least by performing operations to:
determine whether a type of a particular first category from the at least one first category of the source data is the same as a type of the at least one first category of the target data; and
responsive to determining that the type of the particular first category of the source data is the same as the type of the at least one first category of the target data, generate the query to obtain the information from the at least one second category of a target data element from the one or more target data elements, wherein the at least one first category of the target data element comprises geocode information defining a geographic location that is the same as a geographic location defined by the respective source address information in the particular first category of the at least one source data element.

16. The device of claim 15, wherein the type of the at least one first category of the target data comprises one of: a geographic location, a geographic area defined by a polygon shape, or a geographic area defined by the geographic location and a distance measurement.

17. The device of claim 13, wherein the processor performs the operations to generate the query to obtain the information from the at least one second category of the one or more target data elements at least by performing operations to:
determine whether a type of a particular first category from the at least one first category of the source data is the same as a type of the at least one first category of the target data;
responsive to determining that the type of the particular first category of the source data is the same as the type of the at least one first category of the target data, determine whether a format of the particular first category of the source data is the same as a format of the at least one first category of the target data;
responsive to determining that the format of the particular first category of the source data is not the same as the format of the at least one first category of the target data, convert the respective source address information in the particular first category of the at least one source data element to the format of the at least one first category of the target data to obtain converted source address information corresponding to the respective source address information in the particular first category of the at least one source data element; and generate the query to obtain the information from the at least one second category of a target data element from the one or more target data elements, wherein the at least one first category of the target data element comprises geocode information defining a geographic location that is the same as a geographic location defined by the converted source.

18. The device of claim 17, wherein the type of the at least one first category of the target data comprises one of: a geographic location, a geographic area defined by a polygon shape, or a geographic area defined by a location and a distance measurement.

19. The device of claim 13, wherein the at least one first category of the source data comprises a plurality of first categories of the source data, and wherein the processor performs the operations to generate the query to obtain the information from the at least one second category of the one or more target data elements at least by performing operations to:
   determine whether a type of a particular first category from the plurality of first categories of the source data is the same as a type of the at least one first category of the target data;
   responsive to determining that the type of the particular first category of the source data is not the same as the type of the at least one first category of the target data, determine, based at least in part on the source data hierarchy, a parent first category from the plurality of first categories of the source data, wherein the parent first category is a parent of the particular first category;
   determine whether a type of the parent first category is the same as the type of the at least one first category of the target data; and
   responsive to determining that the type of the parent first category is the same as the type of the at least one first category of the target data, generate the query to obtain the information from the at least one second category of a target data element from the one or more target data elements, wherein the at least one first category of the target data element comprises geocode information defining a geographic location that is the same as a geographic location defined by the parent first category of the at least one source data element.

20. The device of claim 19, wherein the type of the at least one first category of the target data comprises one of: a geographic location, a geographic area defined by a polygon shape, or a geographic area defined by a location and a distance measurement.

21. A computer program product comprising:
   a non-transitory computer readable storage medium having program instructions stored thereon, the program instructions executable by at least one processor to cause the at least one processor to:
   receive source data comprising one or more source data elements of a database wherein at least one first category of the source data comprises respective source address information for each of the one or more source data elements and wherein at least one second category of the source data comprises respective entity information for each of the one or more source data elements;
   receive target data comprising a geocoded information table that includes one or more target data elements, wherein at least one first category of the target data comprises respective geocode information for each of the one or more target data elements, the respective geocode information defining a respective geographic location for each of the one or more target data elements, and wherein at least one second category of the target data comprises respective census data for the respective geographic location for each of the one or more target data elements, wherein the target data is different from the source data;
   receive a metadata model, wherein the metadata model defines a hierarchical structure of categories of the source data;
   align the source data to the hierarchical structure defined in the metadata model to form a source data hierarchy;
   generate, for at least one source data element from the one or more source data elements, a query to obtain information from the at least one second category of the one or more target data elements based at least in part on (i) the respective source address information for the at least one source data element, (ii) the source data hierarchy, and (iii) the respective geocode information for each of the one or more target data elements;
   join, responsive to generating the query, the at least one second category of the at least one source data element with the information from the at least one second category of the one or more target data elements to form a joined dataset, wherein the joined dataset comprises the at least one second category of the at least one source data element combined with the information from the at least one second category of the one or more target data elements; and
   generate, based at least in part on the joined dataset, a geospatial report.

22. The computer program product of claim 21, wherein the at least one first category of the source data comprises a plurality of first categories of the source data, and wherein the program instructions executable by the at least one processor to cause the at least one processor to generate the query to obtain the information from the at least one second category of the one or more target data elements comprise program instructions executable by the at least one processor to cause the at least one processor to:
   determine whether a type of a particular first category from the plurality of first categories of the source data is the same as a type of the at least one first category of the target data;
   determine, responsive to determining that the type of the particular first category of the source data is not the same as the type of the at least one first category of the target data, based at least in part on the source data hierarchy, a parent first category from the plurality of first categories of the source data, wherein the parent first category is a parent of the particular first category;
   determine whether a type of the parent first category is the same as the type of the at least one first category of the target data; and
   generate, responsive to determining that the type of the parent first category is the same as the type of the at least one first category of the target data, the query to obtain the information from the at least one second category of a target data element from the one or more target data elements, wherein the at least one first category of the target data element comprises geocode information defining a geographic location that is the same as a geographic location defined by the parent first category of the at least one source data element.

23. The computer program product of claim 22, wherein the type of the at least one first category of the target data comprises one of: a geographic location, a geographic area defined by a polygon shape, or a geographic area defined by a location and a distance measurement.

24. The computer program product of claim 23, wherein the geographic location comprises a combination of a latitude attribute and a longitude attribute.

* * * * *